United States Patent [19]

Fehrenbach et al.

[11] Patent Number: 4,997,286

[45] Date of Patent: Mar. 5, 1991

[54] APPARATUS FOR MEASURING TEMPERATURE USING A SENSOR ELEMENT

[75] Inventors: Gustav W. Fehrenbach, Hanau; Stefan Schmidt, Rüsselsheim, both of Fed. Rep. of Germany

[73] Assignee: Degussa AG, Frankfurt, Fed. Rep. of Germany

[21] Appl. No.: 347,195

[22] Filed: May 4, 1989

[30] Foreign Application Priority Data

May 12, 1988 [DE] Fed. Rep. of Germany ....... 8806290
Jun. 24, 1988 [DE] Fed. Rep. of Germany ....... 8808168

[51] Int. Cl.$^5$ ...................... G01N 21/04; G02B 6/255
[52] U.S. Cl. ............................. 374/131; 250/227.21; 350/96.21; 374/161
[58] Field of Search ....................... 374/121, 131, 161; 250/227, 231 R, 227.21; 350/96.18, 96.20, 96.21

[56] References Cited

U.S. PATENT DOCUMENTS

| | | | |
|---|---|---|---|
| 4,033,668 | 7/1977 | Presby | 350/96.21 |
| 4,119,363 | 10/1978 | Camlibel et al. | 350/96.2 |
| 4,223,226 | 9/1980 | Quick et al. | 374/130 X |
| 4,456,330 | 6/1984 | Blüdaü | 350/96.18 |
| 4,498,731 | 2/1985 | Winzer et al. | 350/96.16 |
| 4,515,434 | 5/1985 | Margolin et al. | 350/96.21 |
| 4,542,987 | 9/1985 | Hirschfeld | 374/161 X |

*Primary Examiner*—Daniel M. Yasich
*Attorney, Agent, or Firm*—Beveridge, DeGrandi & Weilacher

[57] ABSTRACT

An apparatus for measuring temperature in a region of high temperature is disclosed herein. The measuring apparatus includes a sensor made from a fluorescent material, located within the region of high temperature. The fluorescent decay time of the fluorescent material is dependent upon the temperature of the fluorescent material. A first optical waveguide is located within the high temperature region and coupled to the sensor by means of a glass solder. The first optical waveguide is coupled to a second optical waveguide located outside the region of high temperature, and the second optical waveguide is connected to a means for detecting and evaluating the fluorescent radiation, also located outside the region of high temperature. A source of excitation radiation is used to cause the fluorescent material to fluoresce, and by measuring the fluorescence decay time, the temperature within the region can be determined.

12 Claims, 1 Drawing Sheet

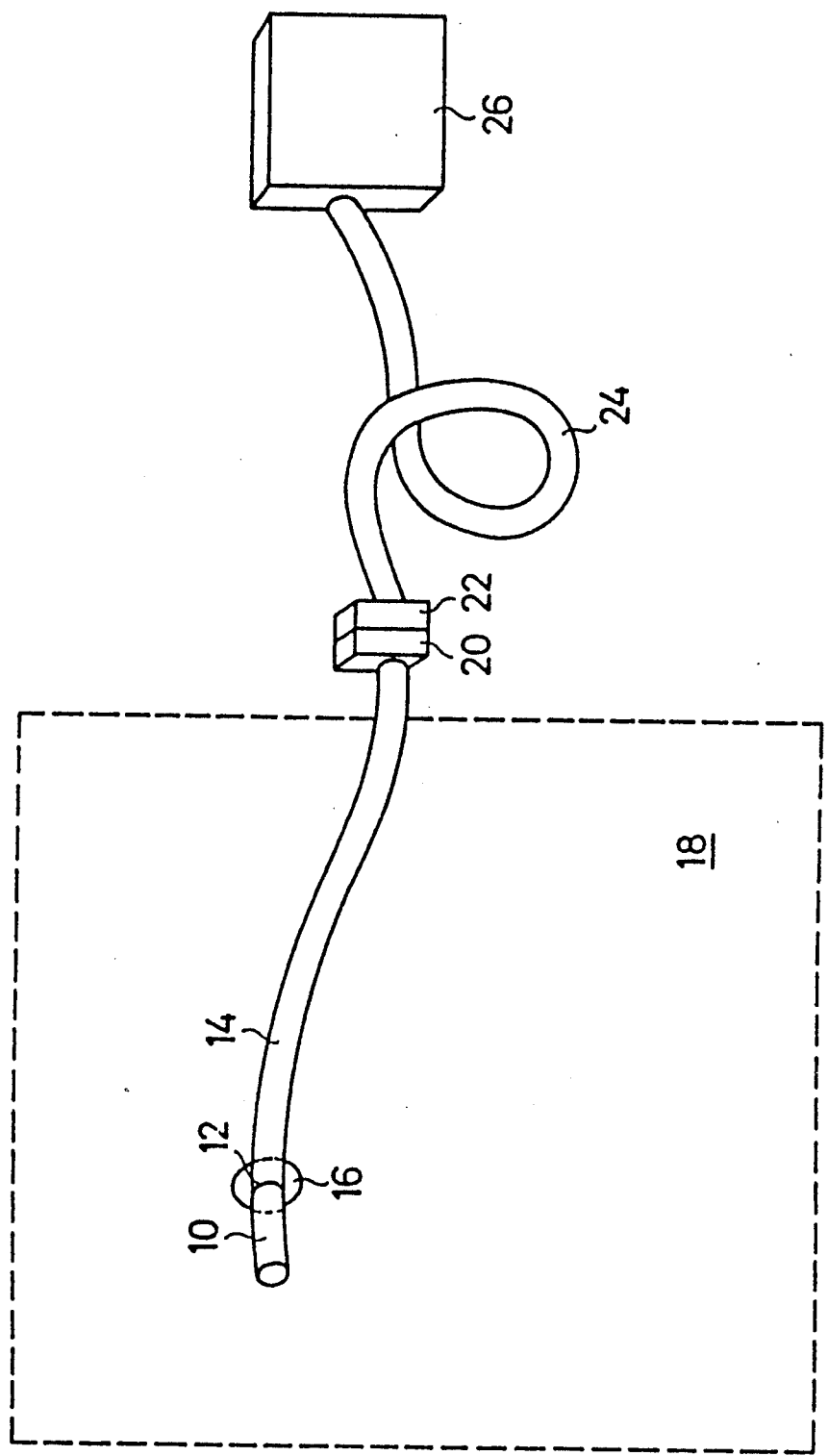

APPARATUS FOR MEASURING TEMPERATURE USING A SENSOR ELEMENT

The invention relates to an apparatus for measuring temperature using a sensor element made from a photoluminescent material which is connected by way of an optical waveguide optical system to a device for producing an excitation radiation and for detecting and evaluating received radiation.

The fluorescence decay period of the radiation of the photoluminescent material is measured by apparatus of the type described above. The fluorescence decay period is dependent upon the prevailing temperature. To transmit the light energy, mostly fibres made from quartz glass or synthetic material are used which have very good transmission properties. Quartz has a relatively low thermal expansion coefficient. Sensor elements suitable for high temperatures, made from a material such as, for example, Cr: YAG, on the other hand, have higher thermal expansion coefficients.

An optically transparent connection must be established between the sensor element and the fibre optic. This optically transparent connection is exposed to approximately the same temperatures as the sensor element used to measure the temperatures. If it is only an area of relatively low temperatures which the sensor element is required to measure, an organic-based optical adhesive, e.g. an epoxy resin, may be used to join the sensor element and the fibre optic. A joint like this is not, however, suitable for continuous operating temperatures in excess of 200° C.

The aim of the invention is further to develop an apparatus of the type mentioned initially so that higher temperatures do not result in damage to the joint between the sensor element and a fibre optic connected thereto.

This aim is achieved in accordance with the invention in that the sensor element is fastened by means of glass solder to one end of at least a first optical waveguide, that the glass solder and the first optical waveguide have thermal expansion coefficients which are adapted at least to the thermal expansion coefficients of the sensor element, and that the other end of the first optical waveguide in a region of low temperature is connected to a second optical waveguide, e.g. standard optical waveguides made from quartz glass, glass, synthetic material etc. In this apparatus, a first optical waveguide, which is not made from quartz glass, is used to effect a connection of high-temperature stability with the sensor element. This intermediate transfer medium generally does not have optical transmission properties for light energy which are as good as quartz glass. Compared the second optical waveguide, the intermediate transfer optical waveguide is substantially shorter since it is only used in the high-temperature region. The fact that the optical transmission properties of the intermediate transfer optical waveguide are inferior is not therefore of any major significance.

Preferably, the first optical waveguide connected to the sensor element is made from a multi-component glass. This multi-component glass, of a composition geared towards an appropriate thermal expansion coefficient, may have approximately the same thermal expansion coefficient as the sensor element and the glass solder made, for example, from the same glass material. The joint, as described above, between the sensor element and the first optical waveguide made from the multi-component glass is easily capable of withstanding temperatures of more than 200 ° C.

Reference is also made to a particularly advantageous further development. The glass solder is used not merely to establish the connection between the optical waveguide and the sensor element. If a glass solder is used with a refractive index which is lower than that of the sensor element and if this glass solder is used not only at the joint but also to form a thin coating over the entire sensor element (e.g. by immersion), then the sensor crystal too becomes a protected optical waveguide. Dirt on the glass solder surface then does not further dampen the signal. The glass solder coating must, however, be at least several μm thick.

It is advantageous if the first optical waveguide connected to the sensor element and/or the second optical waveguide connected to a device for producing an excitation radiation and for detecting and evaluating received radiation is a flexible optional waveguide.

It is also possible for the first optical waveguide connected to the sensor element and/or the second optical waveguide connected to a device for producing an excitation radiation and of detecting and evaluating received radiation to be a fibre optic.

The optical waveguides or fibre optics are preferably connected to one another by means of plug-in elements of a connector. This type of connection permits the sensor element with the optical fibre made from multi-component glass fastened thereon to be handled as a independent unit. This unit can be connected to standard optical waveguides such as optical fibres made from quartz glass of varying length, thereby making its use very flexible.

The optical waveguides may also advantageously be connected to one another by glue splice connections. A joint like this is particularly cost-effective to produce.

The cross-sections of the materials at the joints have to be adapted to one another. It may be expedient on production engineering grounds to connect the optical waveguide not to a cylindrical sensor element of the same diameter but to a sensor element with a square crosssection. This entails adaptation of the cross-section so that the edge length of the square cross-section is equal to the diameter of the optical waveguide.

It may also be expedient to use optical waveguides with a slightly different numerical aperture and somewhat varying core diameter. At the cost of additional losses, a more stable coupling is thereby achieved, which is therefore less susceptible to interference.

BRIEF DESCRIPTION OF DRAWING

Further details, advantages and features of the invention are evident not only from the sub-claims, the features indicated in them—individually and/or in combination—but also from the following description of preferred embodiments as illustrated in the single figure of drawing. The drawing shows a sensor element (10) made from a photolumicescent material such as, for example, Cr: YAG, one flat side (12) of which abuts a flat face of a first optical waveguide (14) made from a multi-component glass. At the edges of the face, the first optical waveguide (14) is firmly joined by glass solder (16) to the sensor element (10). The material of the optical waveguide (14) and of the glass solder (16) is selected so that their thermal expansion coefficients are equal or approximately equal to the thermal expansion coefficient of the sensor element (10). The sensor element (10) and the largest portion of the optical waveguide (14) are located in chamber (18) in which a high temperature prevails which is to be measured by the sensor element (10).

The second face of the optical waveguide (14) is connected outside of the chamber (18) to a plug-in element (20) of a connector for optical waveguides. The other plug-in element (22) of the connector is connected to one end of a second standard optical waveguide (24), the other end of which is connected to a device (26) for producing an excitation radiation and for detecting and evaluating the radiation of the sensor element (10) fed back by way of the first and second optical waveguides (14) and (24).

The device (26) measures the fluorescence decay period of the radiation of the photoluminescent material of the sensor element (10). The flourescence decay period is dependant in a known manner upon the temperature in the chamber (18).

The firm joint produced by the glass solder (16) between the sensor element (10) and the first optical waveguide (14) can withstand high temperatures of, e.g., more than 400° C. The apparatus illustrated in the drawing is therefore suitable for measuring high temperatures. The sensor element (10) and the first optical waveguide (14) in conjunction with the plug-in element (20) form an independent unit which is connectible to second optical waveguides (24) of varying length, depending upon the spatial conditions and the distance between the chamber (18) and the device (26).

Instead of a detachable connector between the first and second optical waveguides, the first optical waveguide may be connected to the second optical waveguide by means of a less expensive glue splice connection.

Instead of single optical waveguides, fibre optics may be used.

The plug-in elements (20), (22) and the glue splice connections are suitable for temperatures up to around 100° C., i.e. the connections may be disposed outside of the chamber (18) but still in its vicinity in order to keep the length of the first optical waveguide (14) or the length of the fibre optics to a minimum. The first optical waveguide (14) is used as a intermediate transfer element between the sensor element (10) and the second optical waveguide (24). Although the optical transmission properties of the first optical waveguide (14) are inferior to those of the second optical waveguide (24), this is not a particular disadvantage owing to the shorter length of the first optical waveguide (14).

Finally, it should be mentioned that the sensor element (10) may of course by provided with mechanical protection such as a sleeve, protective tube, hinged cover, which may be made from any suitable, temperature-resistant materials.

We claim:

1. An apparatus for measuring a temperature in a high temperature region of greater than 200° C. by measuring a fluorescence decay time of a fluorescent material located within the region, said apparatus comprising:
a sensor including said fluorescent material, said fluorescence decay time of the fluorescent material depending upon the temperature in the region where said sensor is located, whereby said fluorescent material emits fluorescent radiation upon exposure to an excitation radiation,
a first optical waveguide connected to said sensor by a glass solder which is capable of withstanding temperatures greater than 200° C., the thermal expansion coefficient of the first optical waveguide and of the glass solder being approximately equal to the thermal expansion coefficient of the sensor, so as to provide an optically transparent connection therebetween, said first optical waveguide being adapted to connect to a second optical waveguide located outside of said region, said second waveguide being adapted to be connected to a means for detecting and evaluating the fluorescent radiation emitted by said fluorescent material.

2. Apparatus according to claim 1, characterized in that the first optical waveguide (14) connected to said sensor (10) comprises a multi-component glass optical waveguide.

3. Apparatus according to claim 1, characterized in that the first optical waveguide (14) connected to the sensor (10) and/or the second optical waveguide (24) connected to said means for detecting and evaluating is a flexible optical waveguide, wherein said means for detecting and evaluating further includes a means for producing an excitation radiation.

4. Apparatus according to claim 1, characterized in that the first optical waveguide (14) connected tot he sensor (10) and/or the second optical waveguide (24) connected to said means for detecting and evaluating is a fibre optic, wherein said means for detecting and evaluating further includes a means for producing an excitation radiation.

5. Apparatus according to claim 1, characterized in that the first and second optical waveguides (14, 24) are connected to one another by plug-in elements (20,22) of a connector.

6. Apparatus according to claim 1, characterized in that the first and second optical waveguides (14, 24) are connected to one another by glue splice connections.

7. Apparatus according to claim 1, characterized in that the sensor (10) is coated with a glass solder, the refractive index of which is lower than that of the sensor.

8. Apparatus according to claim 1, characterized in that the cross-section of the first optical waveguide (14) is adapted to that of the element (10).

9. Apparatus according to claim 8, characterized in that the cross-section of the sensor (10) is square.

10. Apparatus according to claim 9, characterized in that the edge length of the cross-sectionally square sensor (10) corresponds to the diameter of the first optical waveguide (14).

11. Apparatus according to claim 1, characterized in that the second optical waveguide (24) has a lower attenuation than the first optical waveguide.

12. The apparatus as defined in claim 1 wherein said sensor includes Cr:YAG.

* * * * *